United States Patent
Sodagar (10) Patent No.: US 12,381,997 B2
(45) Date of Patent: Aug. 5, 2025

(54) METHOD AND APPARATUS FOR DYNAMIC DASH PICTURE-IN-PICTURE STREAMING

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 45 days.

(21) Appl. No.: 17/949,528

(22) Filed: Sep. 21, 2022

(65) Prior Publication Data

US 2023/0108426 A1   Apr. 6, 2023

Related U.S. Application Data

(60) Provisional application No. 63/252,398, filed on Oct. 5, 2021.

(51) Int. Cl.
| | |
|---|---|
| *H04N 5/45* | (2011.01) |
| *H04L 65/61* | (2022.01) |
| *H04L 67/02* | (2022.01) |

(52) U.S. Cl.
CPC .............. *H04N 5/45* (2013.01); *H04L 65/61* (2022.05); *H04L 67/02* (2013.01)

(58) Field of Classification Search
CPC ............ H04L 65/61; H04L 67/02; H04N 5/45
USPC ....................................................... 709/230
See application file for complete search history.

(56) References Cited

U.S. PATENT DOCUMENTS

| | | |
|---|---|---|
| 2015/0304665 A1 | 10/2015 | Hannuksela et al. |
| 2018/0270515 A1 | 9/2018 | Ramaswamy et al. |
| 2019/0014165 A1 | 1/2019 | Stockhammer et al. |
| 2020/0177941 A1 | 6/2020 | El Essaili et al. |
| 2020/0413108 A1 | 12/2020 | Oh et al. |

(Continued)

FOREIGN PATENT DOCUMENTS

| | | | | |
|---|---|---|---|---|
| JP | 2023-8947 A | 1/2023 | | |
| WO | WO-2017029400 A1 * | 2/2017 | ........... | H04N 21/231 |

OTHER PUBLICATIONS

"Information technology—Dynamic adaptive streaming over HTTP (DASH)—Part 1: Media presentation description and segment formats", ISO 23009-1:2021(X), ISO/IEC JTC 1/SC 29/WG 3, Jun. 24, 2021, 333 total pages.

(Continued)

*Primary Examiner* — Glenford J Madamba
(74) *Attorney, Agent, or Firm* — Sughrue Mion, PLLC (57) ABSTRACT

A method and apparatus may be provided for dynamically signaling picture-in-picture video during media streaming. The method may include determining whether video data comprises a first main video stream and a second picture-in-picture video stream based on a first role value associated with the first main video stream and a second role value associated with the second picture-in-picture video stream; determining a preselection descriptor indicating that the second picture-in-picture video stream is selected to be signaled with the first main video stream in the DASH media streaming; merging the first main video stream with the second picture-in-picture video stream as a combined video stream using the preselection descriptor; and updating the preselection descriptor using an update media presentation descriptor (MPD).

17 Claims, 6 Drawing Sheets

(56) References Cited

U.S. PATENT DOCUMENTS

2023/0018718 A1* 1/2023 Wang .............. H04N 21/23439

OTHER PUBLICATIONS

"Technologies under Consideration for Dynamic Adaptive Streaming over HTTP 23009, Parts 1, 3, 4, 5, 6 and 8", ISO/IEC JTC 1/SC 29/WG 03, N0333, Jul. 23, 2021, 112 total pages.
Jia Guo et al., "EAAT: Environment-Aware Adaptive Transmission for Split-Screen Video Streaming", IEEE Transactions and Circuits and Systems for Video Technology, 2020, vol. 30, No. 11, pp. 4355-4367 (13 pages total).
Written Opinion of the International Searching Authority dated Jan. 5, 2023 in International Application No. PCT/US2022/044499.
International Search Report dated Jan. 5, 2023 in International Application No. PCT/US2022/044499.
Communication issued Jan. 14, 2025 in Japanese Application No. 2023-561377.

* cited by examiner

METHOD AND APPARATUS FOR DYNAMIC DASH PICTURE-IN-PICTURE STREAMING

CROSS REFERENCE TO RELATED APPLICATION

The present application claims priority to U. S. Provisional Application No. 63/252,398, filed on Oct. 5, 2021, the contents of which is hereby expressly incorporated by reference, in its entirety, into the present application.

FIELD

Embodiments of the present disclosure are directed to the streaming media content, and more particularly to streaming picture-in-picture content in accordance with Moving Picture Experts Group (MPEG) dynamic adaptive streaming over hypertext transfer protocol (DASH).

BACKGROUND

MPEG DASH provides a standard for streaming media content over IP networks. In MPEG DASH, the DASH manifest, media presentation descriptor (MPD) enables description of various types of content, but fails to provide any explicit picture-in-picture signaling in DASH. Furthermore, the implicit methods in related art also fail to provide an interoperable method or solution for picture-in-picture signaling.

Therefore, a method for delivering picture-in-picture media streaming using explicit extensions and existing DASH standards is needed.

SUMMARY

The present disclosure addresses one or more technical problems. The present disclosure includes a method, process, apparatus, and non-transitory computer-readable medium for implementing picture-in-picture media content using DASH streaming. Furthermore, embodiments of the present disclosure are also directed to dynamically updating a location, size, resolution, etc., of the picture-in-picture media content during the streaming session.

Embodiments of the present disclosure may provide a method for dynamically signaling picture-in-picture video during dynamic adaptive streaming over HTTP (DASH) media streaming. The method may be performed by a processor, and may include determining whether video data comprises a first main video stream and a second picture-in-picture video stream based on a first role value associated with the first main video stream and a second role value associated with the second picture-in-picture video stream; determining a preselection descriptor indicating that the second picture-in-picture video stream is selected to be signaled with the first main video stream in the DASH media streaming; merging the first main video stream with the second picture-in-picture video stream as a combined video stream using the preselection descriptor; and updating the preselection descriptor using an update media presentation descriptor (MPD).

Embodiments of the present disclosure may provide an apparatus for dynamically signaling picture-in-picture video during dynamic adaptive streaming over HTTP (DASH) media streaming. The apparatus may include at least one memory configured to store computer program code; at least one processor configured to access the computer program code and operate as instructed by the computer program code. The program code may include first determining code to cause the at least one processor to determine whether video data comprises a first main video stream and a second picture-in-picture video stream based on a first role value associated with the first main video stream and a second role value associated with the second picture-in-picture video stream; second determining code to cause the at least one processor to determine a preselection descriptor indicating that the second picture-in-picture video stream is selected to be signaled with the first main video stream in the DASH media streaming; first grouping code to cause the at least one processor to merge the first main video stream with the second picture-in-picture video stream as a combined video stream using the preselection descriptor; and first updating code to cause the at least one processor to update the preselection descriptor using an update media presentation descriptor (MPD).

Embodiments of the present disclosure may provide a non-transitory computer-readable medium storing instructions. The instructions may include one or more instructions that, when executed by one or more processors of a device for dynamically signaling picture-in-picture video during dynamic adaptive streaming over HTTP (DASH) media streaming, cause the one or more processors to determine whether video data comprises a first main video stream and a second picture-in-picture video stream based on a first role value associated with the first main video stream and a second role value associated with the second picture-in-picture video stream; determine a preselection descriptor indicating that the second picture-in-picture video stream is selected to be signaled with the first main video stream in the DASH media streaming; merge the first main video stream with the second picture-in-picture video stream as a combined video stream using the preselection descriptor; and update the preselection descriptor using an update media presentation descriptor (MPD).

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
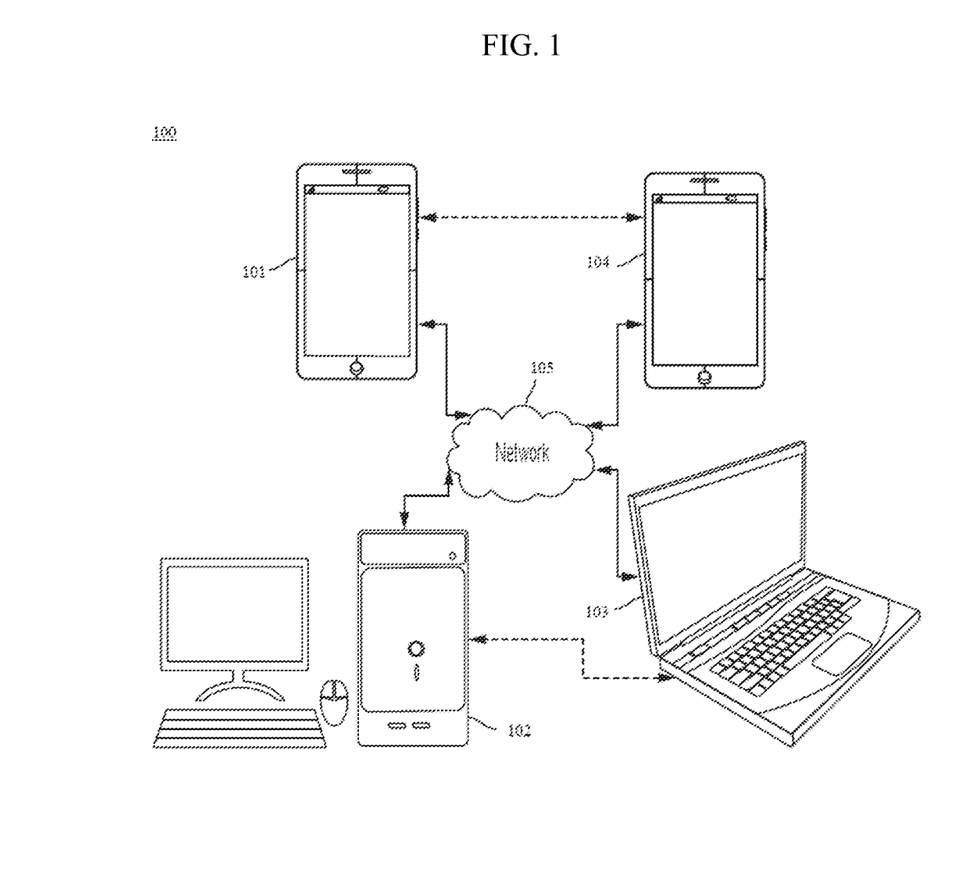
FIG. 1 is a simplified illustration of a communication system, in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
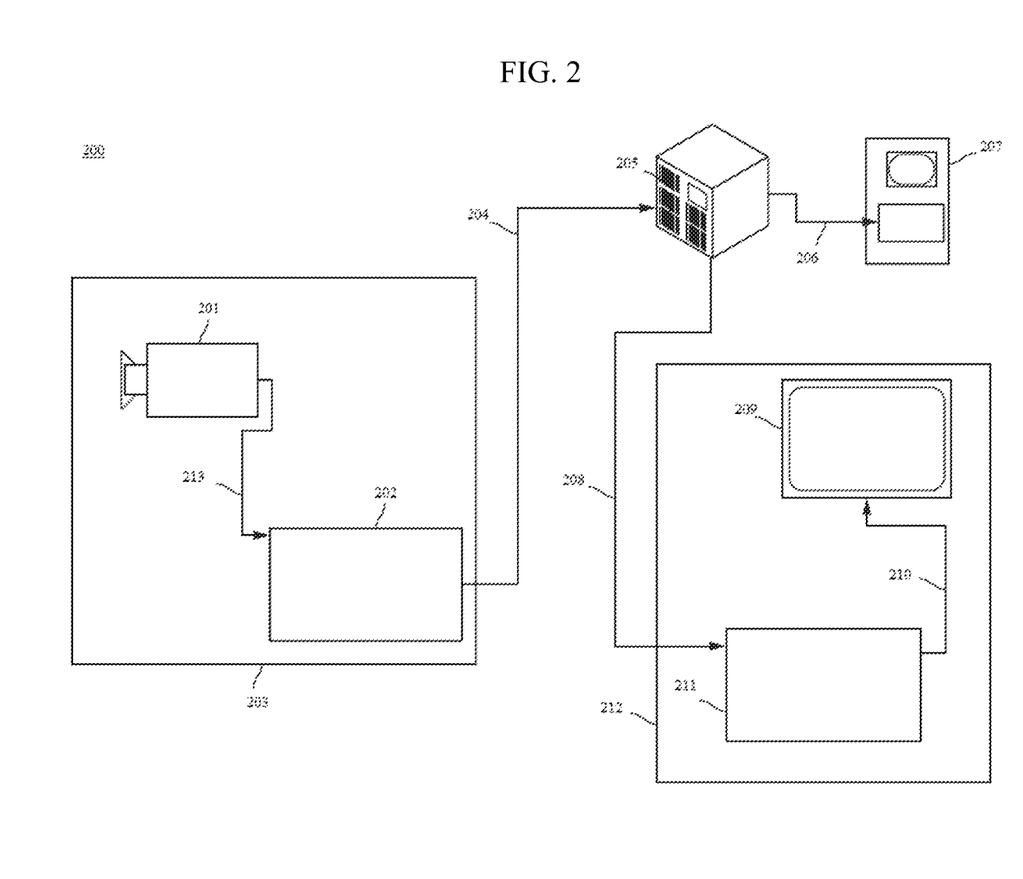
FIG. 2 is an example illustration of placements of components in a streaming environment, in accordance with embodiments.

FIG. 2 illustrates, as an example, the placement of a video encoder and decoder in a streaming environment. Embodiments may be applicable to other video enabled applications, including, for example, video conferencing, digital TV, storing of compressed video on digital media including CD, DVD, memory stick and the like, and so on.

A streaming system may include a capture subsystem 203 that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201. The encoder 202 can include hardware, software, or a combination thereof to enable or implement aspects of embodiments as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve encoded video bitstream 208 and 206 which may be copies of the encoded video bitstream 204. A client 212 can include a video decoder 211 which decodes the incoming copy of the encoded video bitstream 208 and creates an outgoing video sample stream 210 that can be rendered on a display 209 or other rendering device. In some streaming systems, the encoded video bitstreams 204, 206 and 208 can be encoded according to certain video coding/compression standards. Examples of those standards are noted above and described further herein.

Figure 3:
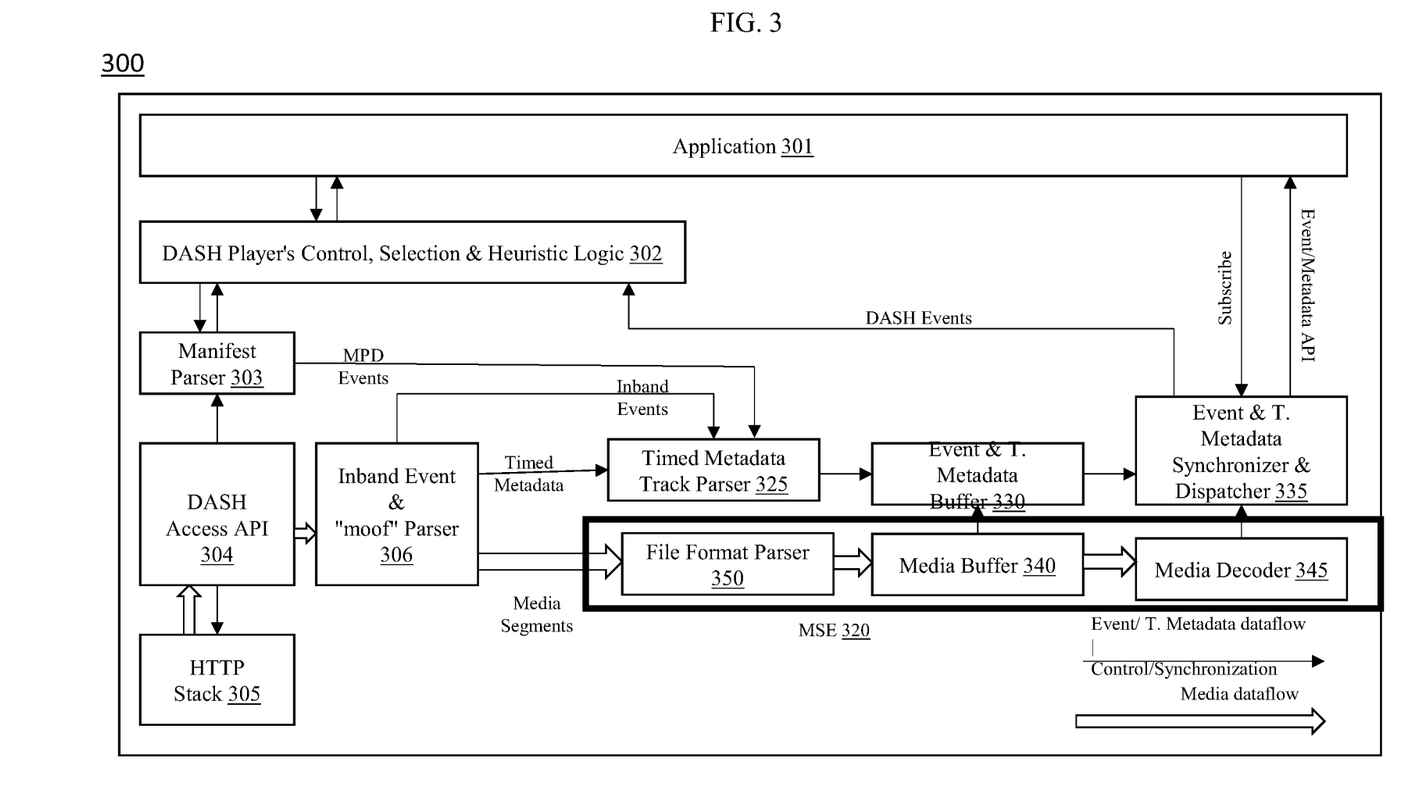
FIG. 3 is a simplified block diagram of a DASH processing model, in accordance with embodiments.

FIG. 3 shows a sample DASH processing model 300, such as of a sample client architecture for processing DASH and CMAF events. In the DASH processing model 300, a client's request of media segments (e.g., ad media segments and live media segments) may be based on described addresses in a manifest 303. The manifest 303 also describes metadata tracks from which a client may access segments of metadata tracks, parse them, and send them to an application 301.

The manifest 303 includes MPD events or events, and an inband event and 'moof' parser 306 may parse MPD event segments or event segments and append the event segments to an event and metadata buffer 330. The inband event and 'moof' parser 306 may also fetch and append the media segments to a media buffer 340. The event and metadata buffer 330 may send event and metadata information to an event and metadata synchronizer and dispatcher 335. The event and metadata synchronizer and dispatcher 335 may dispatch specific events to DASH players control, selection, and heuristic logic 302 and application related events and metadata tracks to application 301.

According to some embodiments, a MSE may include a pipeline including a file format parser 350, the media buffer 340, and a media decoder 345. MSE 320 is a logical buffer(s) of media segments, where the media segments may be tracked and ordered based on the media segments' presentation time. Media segments may include but may not be limited to ad media segments associated with ad MPDs and live media segments associated with live MPDs. Each media segment may be added or appended to the media buffer 340 based on the media segments' timestamp offset, and the timestamp offset may be used to order the media segments in the media buffer 340.

Since embodiments of the present application may be directed to building a linear media source extension (MSE) buffer from two or more nonlinear media sources using MPD chaining, and the nonlinear media sources may be ad MPDs and live MPDs, the file format parser 350 may be used to process the different media and/or codecs used by the live media segments included in the live MPDs. In some embodiments, the file format parser may issue a change type based on a codec, profile, and/or level of the live media segments.

As long as media segments exist in the media buffer 340, the event and metadata buffer 330 maintains corresponding event segments and metadata. The sample DASH processing model 300 may include a timed metadata track parser 325 to keep track of the metadata associated with the inband and MPD events. According to FIG. 3, the MSE 320 includes only the file format parser 350, the media buffer 340, and the media decoder 345. The event and metadata buffer 330 and event and metadata synchronizer and dispatcher 335 are not native to the MSE 320, inhibiting the MSE 320 from natively processing events and sending them to the application.

According to an aspect, an MPD is a media presentation description that may include a media presentation in a hierarchical organization. An MPD may include one or more sequence of periods, wherein each period may include one or more adaptation sets. Each adaptation set in an MPD may include one or more representations, each representation including one or more media segments. These one or more media segments carry the actual media data and associated metadata being encoded, decoded, and/or played. According to embodiments of the present disclosure, overlay video may refer to the single or combined experience stream or may refer to the pip video stream.

Figure 4:
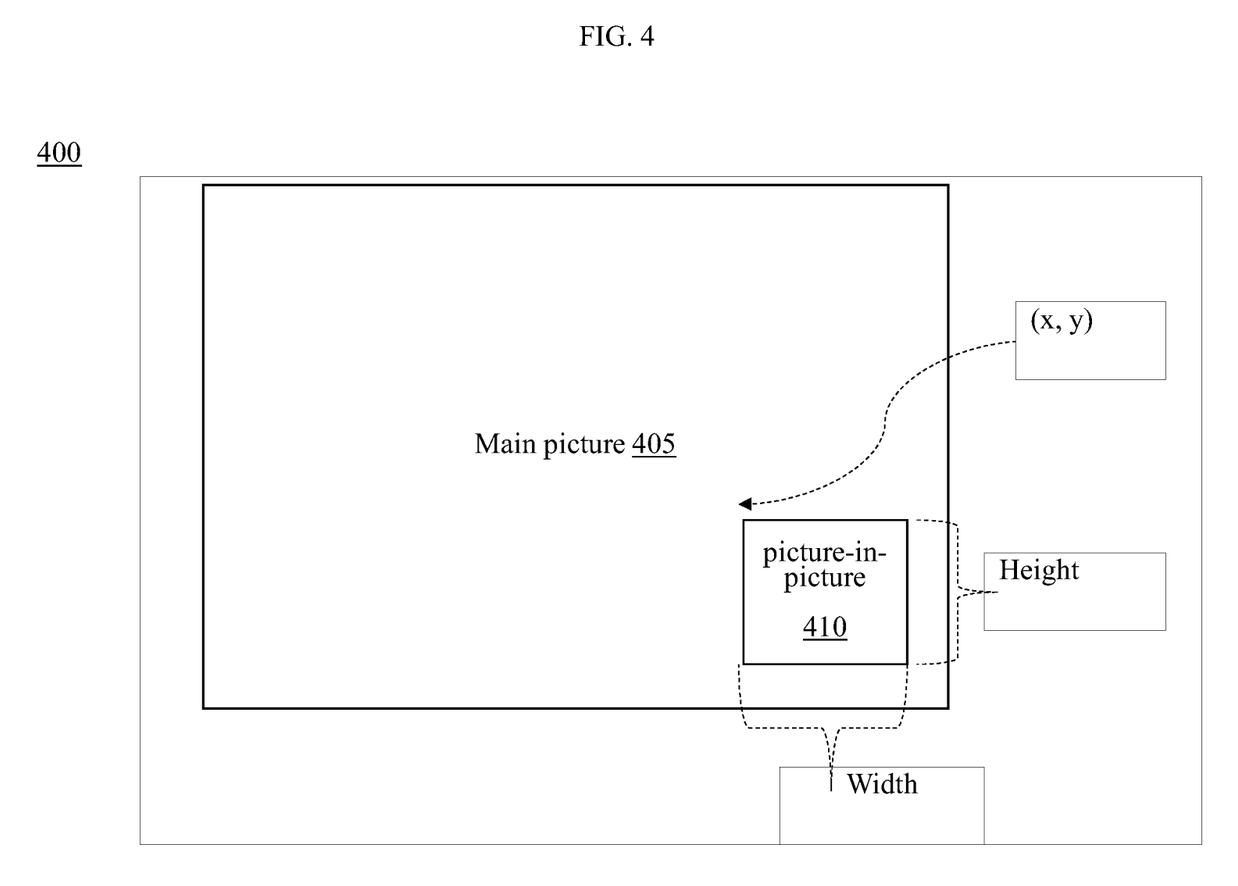
FIG. 4 is a simplified illustration of picture-in-picture set-up, in accordance with embodiments.

FIG. 4 is an exemplary figure illustrating a picture-in-picture media presentation 400.

As shown in FIG. 4, a main picture 405 takes the entire screen while the overlay picture (picture-in-picture 410) takes a small area of the screen, covering the corresponding area of the main picture. The coordinate of the picture-in-picture (pip) is indicated by x, y, height, and width, where these parameters define the location and size of the pip relative to the main picture coordinates.

In the context of streaming, the main video (or main picture 405) and the pip video (or picture-in-picture 410) may be delivered as two separate streams. If there are independent streams, they may be decoded by separate decoders and then composed together for rendering. As another embodiment, if the video codec used for the main video supports merging the streams, the pip video stream is combined with the main video stream. In some embodiments, the pip video stream may replace the main video streamed in the covered area of the main video with the pip video. Then, the single and/or combined stream is sent to the decoder for decoding and rendering.

According to an aspect, if the main video and pip video are related (such as a sign video at a corner of the screen signing what is said on the main screen), the location of the pip video in the main video may need to be changed. As an example, if the area that the pip picture changes from the background to foreground the location of the pip picture may need to be changed. Similarly, the resolution of the pip picture may need to be changed. Also, for some duration of the media presentation, the pip picture may not be needed. These dynamic changes relating to streaming picture-in-picture are not handled by the DASH. Additionally, DASH also fails to handle this dynamic change of the location and resolution without changing the main and pip video streams.

Embodiments of the present disclosure are related to solving the technical problems mentioned above. According to an embodiment, picture-in-picture is delivered in DASH when the main video and the pip video may be independently decoded then combined. According to another embodiment, picture-in-picture is delivered in DASH when the main video and the pip video may be combined into a single stream prior to decoding and are decoded together as the single stream (also referred to as a "combined stream" herein).

Delivery of picture-in-picture in DASH when the main video and the pip video are independently decoded A pip video stream and a main video stream may be identified using a DASH role scheme. According to an aspect, the main video stream may use a role value of "main" whereas the pip video stream may use a new value "pip" or "picture-in-picture" to identify the corresponding adaptation sets. In some embodiments, the value of the role attribute (e.g., main or pip) is independent of the value "signed" since the overlaid picture is not always necessarily a "signed" video. In the cases that it is, both values can be used to signal the properties of the overlay video.

The main video stream and the pip video stream may be grouped as a single experience using a Preselection descriptor. In some embodiments, the pip video stream adaptation set may include a Preselection descriptor referencing the main video stream's adaptation set.

Location of the pip video may be signaled using a DASH standard, e.g., the 23009-1 Annex H Spatial Relation Descriptor (SRD). This descriptor may be used signal the location and size of the pip video. The SRD descriptor allows to define the x, y, width, and height relative to a common coordinate system. This descriptor may be used in both main and overlay video adaptation sets to define the relationship of the components with each other. The location and size update may be achieved with one of the following mechanisms:

(1) MPD update to update the values of SRD for updating the location, size, resolution, etc., of the picture in picture with introducing a new period when the location, size and/or the resolution is changed;

(1) Use of the metadata track that contains the coordinate information according to 23009-1 Annex H.

Delivery of picture-in-picture in DASH when the main video segments and pip video segments are merged with the video stream before decoding According to embodiments, the main video stream and the pip video stream and pip video stream may be grouped as a single experience using a Preselection element. In some embodiments, grouping the main video stream and the pip video stream may include identifying the pip video stream and the main video stream based the DASH Role scheme inside Preselection element. The main video stream may use the "main" value for Role, while the pip video stream may use a new value "picture-in-picture" or "pip" to identify the corresponding adaptation sets. It may be understood that the values of role being "pip" or "picture-in-picture" may be used interchangeably or may have special indication. As an example, use of "pip" may indicate independent decoding followed by overlay. As another example, the user of "picture-in-picture" may indicate grouping into a single experience followed by decoding.

According to a same or another embodiment, grouping the main video stream and the pip video stream may further include a new value 'pip' for Preselection@order may be defined for replacing parts of the main video stream with the overlaid video stream. Additionally, in some embodiments, a new attribute Preselection @replacementRules may be added to define the replacement rule. As an example, when the codec used is VVC, the @replacementRule may include a subpicture OD. The semantics of the @replacementRules attribute would be codec-dependent.

MPD update to insert a new Period and for updates to the values of Preselected element including the @replacementRules may be defined. In an embodiment, MPD update to insert a new Period and for updates to the values of Preselected element where the merge of the pip video stream with the main video stream may be defined.

An advantage of the present disclosure is a elegant and only necessary extensions to the DASH standard to efficiently perform picture-in-picture signaling dynamically. In an embodiment, a new role value of "picture-in-picture" (or an appropriate version thereof) may be added to the DASH standard to indicate the presence of a main video stream and a pip video stream. In a same or another embodiment, a new @order value of "replacement" (or an appropriate version thereof) may be added to the DASH standard to indicate that the pip video stream may need to be replace parts of the main video stream. According to a same or another embodiment, a new attribute called @replacementRules may be added to the DASH standard to define one or more replacement rules based on the codec of the main video stream and the pip video stream.

Embodiments of the present disclosure may relate to methods, systems, and processes for signaling picture-in-picture video and its relationship with the main video in DASH streaming dynamically. When the picture-in-picture video and the main video are independently decoded, the role attribute with a special value may be used to signal the picture-in-picture video stream. In some embodiments, the main video may have a Role value "main." In some embodiments the Preselection descriptor may be used to tie the picture-in-picture video adaptation set to the main video adaptation set. In some embodiments, the location and size of picture-in-picture video on the main video may be defined by the SRD descriptors in both main and picture-in-picture video adaptation sets. The location and the size of the picture-in-picture video may be updated using MPD update and by inserting new periods with the new SRD values. In other embodiments, a metadata track may be used to convey and/or update the location and size information dynamically.

Embodiments of the present disclosure may relate to methods, systems, and processes for signaling picture-in-picture video and its relationship with the main video in DASH streaming dynamically when picture-in-picture video and the main video may be merged before decoding. In some embodiments, a Preselection element may be used to signal the group of main and picture-in-picture adaptation sets. The role attribute with a special value may be used to signal the picture-in-picture video stream while the main video has Role value "main." In some embodiments, a new value for the attribute order may be used to signal the picture-in-picture application a new attribute may be used to define how the two streams are merged before sending to the decoder. The location and size of the picture-in-picture may be updated with an MPD update that may insert a new period. In some embodiments, the attribute defining the merging rules may be updated to reflect that a new area of the main video stream should be replaced with the picture-in-picture stream.

Figure 5:
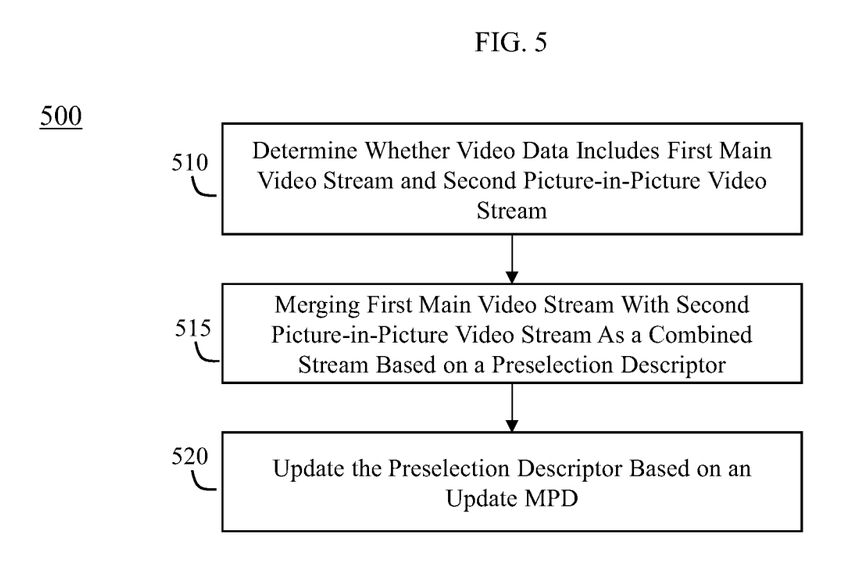
FIG. 5 is an exemplary flowchart illustration for dynamically signaling picture-in-picture video during media streaming, in accordance with embodiments.

FIG. 5 is an exemplary flowchart of process 500 for dynamically signaling picture-in-picture video during media streaming.

At operation 510, whether video data comprises a first main video stream and a second picture-in-picture video stream based on a role value associated with the first main video stream and the second picture-in-picture video stream may be determined.

At operation 515, the first main video stream with the second picture-in-picture video stream may be merged as a single video stream based on a preselection descriptor, wherein the preselection descriptor may be associated with the second picture-in-picture video stream.

In some embodiments, whether the first main video stream and the second picture-in-picture video stream are independently decoded prior to the grouping may be determined based on a first role value associated with the first main video stream being a main value and a second role value associated with the second picture-in-picture video stream being a picture-in-picture value. Then, a first main video content associated with the adaptation set is grouped with a second picture-in-picture video content as the single video stream based on the preselection descriptor associated with the second picture-in-picture video stream referencing an adaptation set in the first main video stream. Grouping may further include signaling a location of the second picture-in-picture video content, a size of the second picture-in-picture video content, or a resolution of the second picture-in-picture video content using a spatial relationship descriptor.

In some embodiments, the first main video stream and the second picture-in-picture video stream may be identified prior to the grouping based on a first role value associated with the first main video stream being a main value and a second role value associated with the second picture-in-picture video stream being a picture-in-picture value. Then, an order value in the preselection descriptor for replacing parts of a first main video content with a second picture-in-picture video content may be defined and one or more replacement rules in the preselection descriptor for replacing parts of the first main video content with the second picture-in-picture video content may be defined. The first main video content with the second picture-in-picture video content may be merged based on at least the one or more replacement rules in the preselection descriptor, wherein the merging is performed prior to decoding the single video stream At operation 520, the preselection descriptor may be updated using an update media presentation descriptor. Based on the first main video stream and the second picture-in-picture video stream being independently decoded prior to the grouping, the location of the second picture-in-picture video content or the size of the second picture-in-picture video content may be updated in the spatial relationship descriptor based on the update MPD. In some embodiments, the location of the second picture-in-picture video content or the size of the second picture-in-picture video content may be updated in the spatial relationship descriptor based on a metadata track containing coordinate information Although FIG. 5 shows example blocks of the process 500, in embodiments, the processes 500 may include additional blocks, fewer blocks, different blocks, or differently arranged blocks than those depicted in FIG. 5. In embodiments, any blocks of processes 500 may be combined or arranged in any amount or order, as desired. In embodiments, two or more of the blocks of the processes 500 may be performed in parallel.

The techniques described above, can be implemented as computer software using computer-readable instructions and physically stored in one or more computer-readable media or by a specifically configured one or more hardware processors. For example, FIG. 6 shows a computer system 600 suitable for implementing various embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
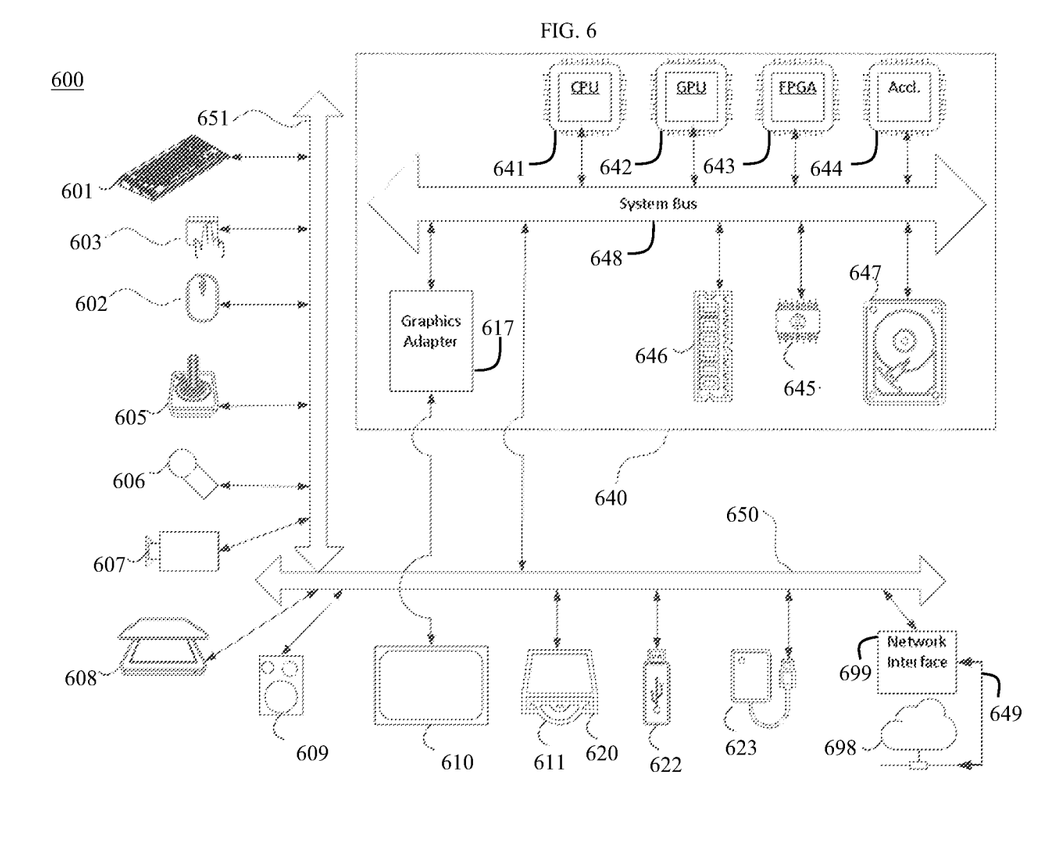
FIG. 6 is a simplified diagram of a computer system, in accordance with embodiments.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 600.

Computer system 600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input. The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each is depicted in the Figures): keyboard 601, mouse 602, trackpad 603, touch screen 610, joystick 605, microphone 606, scanner 608, camera 607.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch screen 610, or joystick 605, but there can also be tactile feedback devices that do not serve as input devices), audio output devices (such as: speakers 609, headphones), visual output devices (such as screens 610 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses, holographic displays and smoke tanks), and printers.

Computer system 600 can also include human accessible storage devices and their associated media such as optical media including CD/DVD ROM/RW 620 with CD/DVD 611 or the like media, thumb-drive 622, removable hard drive or solid state drive 623, legacy magnetic media such as tape and floppy disc, specialized ROM/ASIC/PLD based devices such as security dongles, and the like.

Those skilled in the art should also understand that term "computer readable media" as used in connection with the presently disclosed subject matter does not encompass transmission media, carrier waves, or other transitory signals.

Computer system 600 can also include interface 699 to one or more communication networks 698. Networks 698 can for example be wireless, wireline, optical. Networks 698 can further be local, wide-area, metropolitan, vehicular and industrial, real-time, delay-tolerant, and so on. Examples of networks 698 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 698 commonly require external network interface adapters that attached to certain general-purpose data ports or peripheral buses (650 and 651) (such as, for example USB ports of the computer system 600; others are commonly integrated into the core of the computer system 600 by attachment to a system bus as described below (for example Ethernet interface into a PC computer system or cellular network interface into a smartphone computer system). Using any of these networks 698, computer system 600 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 640 of the computer system 600.

The core 640 can include one or more Central Processing Units (CPU) 641, Graphics Processing Units (GPU) 642, a graphics adapter 617, specialized programmable processing units in the form of Field Programmable Gate Areas (FPGA) 643, hardware accelerators for certain tasks 644, and so forth. These devices, along with Read-only memory (ROM) 645, Random-access memory 646, internal mass storage such as internal non-user accessible hard drives, SSDs, and the like 647, may be connected through a system bus 648. In some computer systems, the system bus 648 can be accessible in the form of one or more physical plugs to enable extensions by additional CPUs, GPU, and the like. The peripheral devices can be attached either directly to the core's system bus 648, or through a peripheral bus 651. Architectures for a peripheral bus include PCI, USB, and the like.

CPUs 641, GPUs 642, FPGAs 643, and accelerators 644 can execute certain instructions that, in combination, can make up the aforementioned computer code. That computer code can be stored in ROM 645 or RAM 646. Transitional data can be also be stored in RAM 646, whereas permanent data can be stored for example, in the internal mass storage 647. Fast storage and retrieval to any of the memory devices can be enabled through the use of cache memory, that can be closely associated with one or more CPU 641, GPU 642, mass storage 647, ROM 645, RAM 646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 600 having the illustrated architecture, and specifically the core 640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 640 that are of non-transitory nature, such as core-internal mass storage 647 or ROM 645. The software implementing various embodiments of the present disclosure can be stored in such devices and executed by core 640. A computer-readable medium can include one or more memory devices or chips, according to particular needs. The software can cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system can provide functionality as a result of logic hardwired or otherwise embodied in a circuit (for example: accelerator 644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for dynamically signaling picture-in-picture video during a dynamic adaptive streaming over HTTP (DASH) media streaming, the method being performed by one or more processors, the method comprising:
determining whether video data comprises a first main video stream and a second picture-in-picture video stream based on a Role element associated with the first main video stream having a first value indicating a main video stream and a Role element associated with the second picture-in-picture video stream having a second value indicating a picture-in-picture video stream;
determining whether the first main video stream and the second picture-in-picture video stream are to be grouped as a single experience based on a preselection descriptor in an adaptation set of the second picture-in-picture video stream referencing an adaptation set of the first main video stream;
merging, subsequent to independent decoding of the first main video stream and the second picture-in-picture video stream, the first main video stream with the second picture-in-picture video stream as a combined video stream; and
updating, when a resolution of the first main video stream and the second picture-in-picture video stream changes, a location of a second picture-in-picture video content in the combined video stream using an MPD update and inserting a new Period.

2. The method of claim 1, wherein the merging comprises:
determining that the first main video stream and the second picture-in-picture video stream are independently decoded prior to the merging based on the Role element associated with the first main video stream being a main value and the Role element associated with the second picture-in-picture video stream being a picture-in-picture value or a special value;
based on the preselection descriptor referencing the adaptation set in the first main video stream, merging a first main video content associated with the adaptation set with the second picture-in-picture video content as the combined video stream; and
signaling the location of the second picture-in-picture video content, a size of the second picture-in-picture video content, or the resolution of the second picture-in-picture video content using the SRD scheme descriptor.

3. The method of claim 2, wherein the updating further comprises:
updating the size of the second picture-in-picture video content or the resolution of the second picture-in-picture video content by updating a @value element.

4. The method of claim 2, wherein the updating further comprises:
updating the location of the second picture-in-picture video content or the size of the second picture-in-picture video content in the SRD scheme descriptor using extracted metadata from a metadata track containing coordinate information.

5. The method of claim 1, wherein the merging comprises:
identifying the first main video stream and the second picture-in-picture video stream prior to the merging based on the Role element associated with the first main video stream being a main value and the Role element associated with the second picture-in-picture video stream being a picture-in-picture value or a special value;
defining an order value in the preselection descriptor for replacing parts of a first main video content with the second picture-in-picture video content; and
defining one or more replacement rules in the preselection descriptor for replacing parts of the first main video content with the second picture-in-picture video content.

6. The method of claim 5, wherein the updating further comprises:
updating the one or more replacement rules in the preselection descriptor using an update media presentation description (MPD).

7. The method of claim 6, wherein the one or more replacement rules are codec dependent.

8. An apparatus for signaling picture-in-picture video during a dynamic adaptive streaming over HTTP (DASH) media streaming, the apparatus comprising:
at least one memory configured to store computer program code;
at least one processor configured to access the computer program code and operate as instructed by the computer program code, the computer program code including:
first determining code to cause the at least one processor to determine whether video data comprises a first main video stream and a second picture-in-picture video stream based on a Role element associated with the first main video stream having a first value indicating a main video stream and a second Role element associated with the second picture-in-picture video stream having a second value indicating a picture-in-picture video stream;
second determining code to cause the at least one processor to determine whether the first main video stream and the second picture-in-picture video stream are to grouped as a single experience based on a preselection descriptor in an adaptation set of the second picture-in-picture video stream referencing an adaptation set of the first main video stream;
first grouping code to cause the at least one processor to merge, subsequent to independent decoding of the first main video stream and the second picture-in-picture video stream, the first main video stream with the second picture-in-picture video stream as a combined video stream; and
first updating code to cause the at least one processor to update, when a resolution of the first main video stream and the second picture-in-picture video stream changes, a location of a second picture-in-picture video content in the combined video stream using an MPD update and inserting a new Period.

9. The apparatus of claim 8, wherein the first grouping code comprises:
third determining code configured to cause the at least one processor to determine that the first main video stream and the second picture-in-picture video stream are independently decoded prior to the merging based on the Role element associated with the first main video stream being a main value and the Role element associated with the second picture-in-picture video stream being a picture-in-picture value or a special value;

second grouping code configured to cause the at least one processor to merge a first main video content associated with the adaptation set with a second picture-in-picture video content as the combined video stream based on the preselection descriptor referencing the adaptation set in the first main video stream; and signaling code configured to cause the at least one processor to signal the location of the second picture-in-picture video content, a size of the second picture-in-picture video content, or a resolution of the second picture-in-picture video content using the SRD scheme descriptor.

10. The apparatus of claim 9, wherein the first updating code comprises:

second updating code to cause the at least one processor to update the size of the second picture-in-picture video content or the resolution of the second picture-in-picture video content by updating a @value element.

11. The apparatus of claim 9, wherein the first updating code comprises:

third updating code to cause the at least one processor to update the location of the second picture-in-picture video content or the size of the second picture-in-picture video content in the SRD scheme descriptor using extracted metadata from a metadata track containing coordinate information.

12. The apparatus of claim 8, wherein the first grouping code comprises:

first identifying code configured to cause the at least one processor to identify the first main video stream and the second picture-in-picture video stream prior to the merging based on the Role element associated with the first main video stream being a main value and the Role element associated with the second picture-in-picture video stream being a picture-in-picture value or a special value;

first defining code configured to cause the at least one processor to define an order value in the preselection descriptor for replacing parts of a first main video content with a second picture-in-picture video content; and second defining code configured to cause the at least one processor to define one or more replacement rules in the preselection descriptor for replacing parts of the first main video content with the second picture-in-picture video content.

13. The apparatus of claim 12, wherein the first updating code comprises:

fourth updating code configured to cause the at least one processor to update the one or more replacement rules in the preselection descriptor using an update media presentation description (MPD).

14. A non-transitory computer-readable medium storing instructions, the instructions comprising: one or more instructions that, when executed by one or more processors of a device for signaling picture-in-picture video during a dynamic adaptive streaming over HTTP (DASH) media streaming, cause the one or more processors to:

determine whether video data comprises a first main video stream and a second picture-in-picture video stream based on a Role element associated with the first main video stream having a first value indicating a main video stream and a Role element associated with the second picture-in-picture video stream having a second value indicating a picture-in-picture video stream;

determining whether the first main video stream and the second picture-in-picture video stream are to be grouped as a single experience based on a preselection descriptor in an adaptation set of the second picture-in-picture video stream referencing an adaptation set of the first main video stream;

merge, subsequent to independent decoding of the first main video stream and the second picture-in-picture video stream, the first main video stream with the second picture-in-picture video stream as a combined video stream; and update, when a resolution of the first main video stream and the second picture-in-picture video stream changes, a location of a second picture-in-picture video content in the combined video stream using an MPD update and inserting a new Period.

15. The non-transitory computer-readable medium of claim 14, wherein the merging comprises:

determining that the first main video stream and the second picture-in-picture video stream are independently decoded prior to the merging based on the Role element associated with the first main video stream being a main value and the Role element associated with the second picture-in-picture video stream being a picture-in-picture value or a special value;

based on the preselection descriptor referencing the adaptation set in the first main video stream, merging a first main video content associated with the adaptation set with the second picture-in-picture video content as the combined video stream; and signaling the location of the second picture-in-picture video content, a size of the second picture-in-picture video content, or the resolution of the second picture-in-picture video content using the SRD scheme descriptor.

16. The non-transitory computer-readable medium of claim 15, wherein updating the preselection descriptor using the update MPD comprises:

updating the size of the second picture-in-picture video content or the resolution of the second picture-in-picture video content by updating a @value element.

17. The non-transitory computer-readable medium of claim 14, wherein the merging comprises:

identifying the first main video stream and the second picture-in-picture video stream prior to the merging based on the Role element associated with the first main video stream being a main value and the Role element associated with the second picture-in-picture video stream being a picture-in-picture value or a special value;

defining an order value in the preselection descriptor for replacing parts of a first main video content with the second picture-in-picture video content; and defining one or more replacement rules in the preselection descriptor for replacing parts of the first main video content with the second picture-in-picture video content.

* * * * *